Oct. 8, 1929.  C. E. MACE  1,730,374
TOILET VALVE
Filed April 14, 1928  2 Sheets-Sheet 2

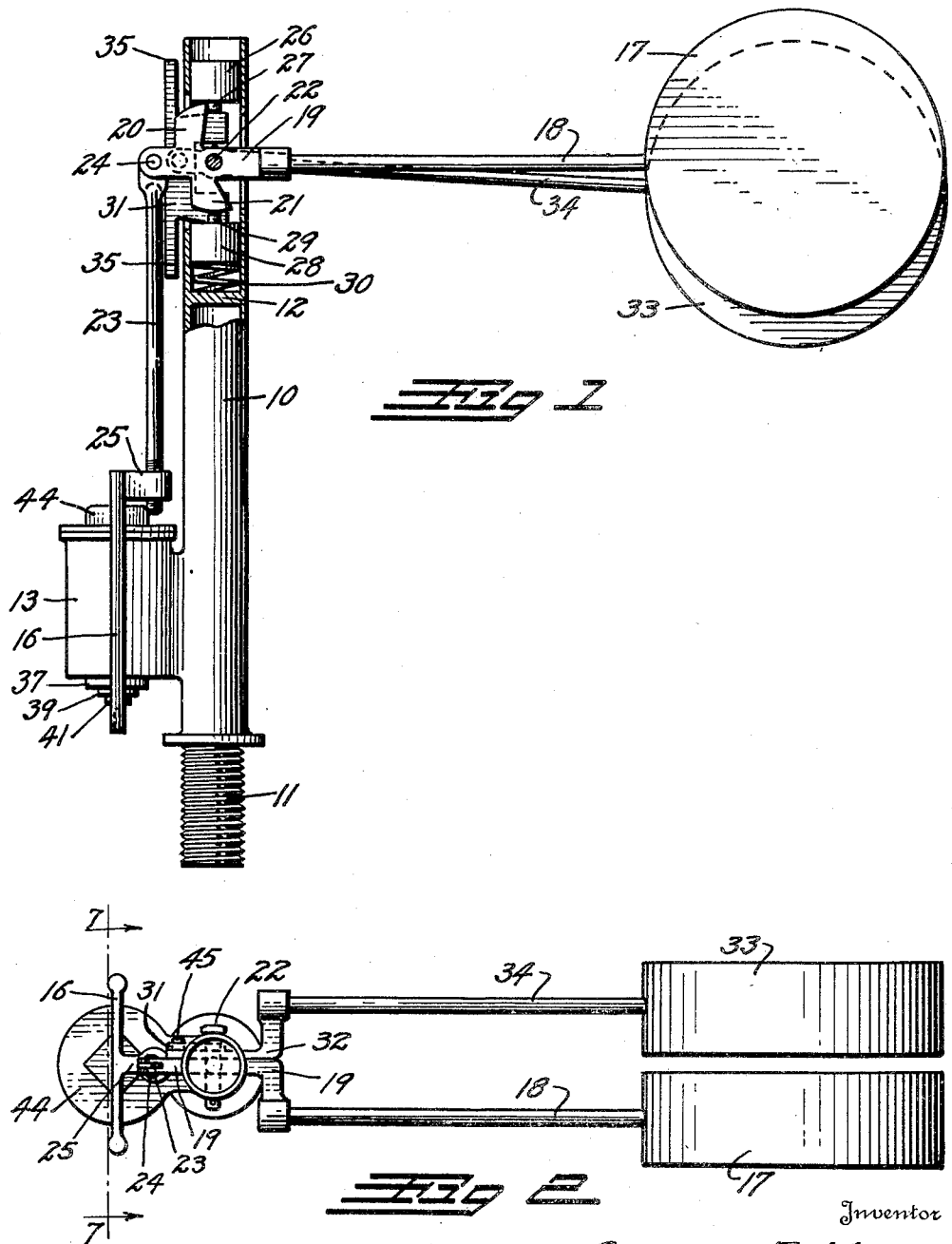

Inventor
CHARLES E. MACE
By
Attorney

Patented Oct. 8, 1929

1,730,374

UNITED STATES PATENT OFFICE

CHARLES E. MACE, OF DENVER, COLORADO, ASSIGNOR OF FIFTEEN PER CENT TO KING TIME BOMB COMPANY, OF DENVER, COLORADO, A CORPORATION OF WYOMING, FIVE PER CENT TO RICHARD S. SHANNON, AND FIFTEEN PER CENT TO E. F. RANDOLPH, BOTH OF DENVER, COLORADO

TOILET VALVE

Application filed April 14, 1928. Serial No. 269,915.

This invention relates to an inlet valve for controlling the admission of water to a toilet tank. In the present toilet tanks the inlet valve gradually opens as the tank empties and gradually closes as the tank fills. The valve is fully open only for an instant when the tank is entirely empty. At all other times the valve is partially closed and the inlet opening restricted. This restriction of the opening increases the velocity of the water and creates considerable noise which is prolonged and increased by the slow gradual closing of the valve.

The principal object of this invention is to provide an operating mechanism for a valve of this character which opens the valve instantly to its full opening after the tank is emptied and which will close the valve instantly when the tank has filled so as to eliminate all objectionable noises.

Another object of the invention is to so construct the valve itself that it can be easily opened to a full, unrestricted opening against the pressure in the supply pipe.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawing:

Fig. 1 is a side elevation of the invention, partly broken away to show the valve locking mechanism.

Fig. 2 is a plan view thereof.

Fig. 3 is a rear elevation with the valve chamber broken away to illustrate my improved valve construction.

Figs. 4, 5, and 6 are detail views illustrating various positions of the locking mechanism to be later described.

Fig. 7 is a cross section thru the valve chamber taken on the line 7—7, Fig. 2.

Fig. 8 is a horizontal section thru the valve chamber taken on the line 8—8, Fig. 7.

The invention comprises a standpipe 10, designed to occupy the usual position of a standpipe in a toilet tank and provided with the usual threads 11, for attaching it thru the tank to a suitable supply pipe. Adjacent the top, the standpipe is closed by a partition 12, which provides an air cushion above the water in the standpipe so that the quick closing of the supply valve will be absorbed and a "water hammer" eliminated. Alongside of the standpipe 10, a valve chamber 13, is cast, which opens to the standpipe thru a passage 14 (see Fig. 3). The bottom of the valve chamber 13 contains a concentric discharge opening surrounded by an annular, upwardly-extending valve seat 15, upon which, my improved valve seats.

The valve (to be later described) is lifted from its seat by means of a valve yoke 16. The valve yoke 16 is raised and lowered by means of a valve float 17, carried on the extremity of a float lever 18. The float lever 18 extends from a locking plate 19, which carries an upwardly extending tooth 20, and a downwardly extending tooth 21. The locking plate 19 is journaled within the stand pipe 10, on a pivot pin 22, and operates the valve yoke 16 through the medium of a connecting rod 23. The connecting rod 23 is detachably secured to the plate 19 by a removable hinge pin 24 and is threaded into a boss 25, upon the valve yoke 16, so that adjustment of its length can be made.

By this construction, downward movement of the float 17 raises the yoke 16 and opens the valve in the valve chamber 13. Upward movement of the float 17 lowers the valve yoke 16 and closes the valve on its seat in the valve chamber 13.

The float 17 is locked in its uppermost position by means of a gravity acting piston latch 26, and a latch 28 which carries a concentric projection 29 adapted to be engaged by the lower tooth 21. The latches 26 and 28 slide within the upper extremity of the standpipe 10, which acts as a guide therefor. The latch 28 is constantly forced upwardly by means of a spring 30, carried on a partition 12.

The latches 26 and 28 are, at the proper time, forced out of engagement with the teeth 20 and 21, respectively, by means of a releasing plate 31. The releasing plate 31 is hinged on the extremity of a releasing member 32, which is in turn pivoted on the pivot pin 22 alongside of the locking plate 19.

The releasing member 32 is swung upon its pivot by means of a locking float 33, which is adjacent the float 17 on the extremity of a second float lever 34, secured in the releasing member 32. The releasing plate 31, is of novel construction having two inwardly projecting faces, adapted to pass into the standpipe 10, and contact with the latches 26 and 28, and a relatively long vertical guide portion 35 adapted to contact with the exterior of the standpipe 10, and maintain the plate in its vertical position.

Let us assume that the toilet tank is full of water. The mechanism will then be in the position illustrated in Fig. 1, with both floats at their uppermost points. If the flush valve of the toilet is now operated to release the water from the tank the locking float 33, will float downwardly as the water level lowers. The valve float 17, however, can not follow the lowering water as the tooth 20 has engaged the projection 27, on the latch 26, which acts to hold the float 17 at the top position. When the water has discharged from the tank the float 33 will have moved sufficiently downward to raise the releasing plate 31, as shown in Fig. 4, to a position which will release the tooth 20 from the projection 27. This allows the float 17 to drop to the lowered surface of the water and assume the position illustrated in Fig. 5. In dropping, the float 17 will raise the valve yoke 16 and instantly open the valve in the chamber 13, allowing the water from the standpipe to fill the tank.

As the tank fills, the float 33 will rise upwardly with the raising water level, as illustrated in Fig. 6. The float 17, however, can not follow the rising water since the projection 29 on the latch 28 has engaged the lower tooth 21 of the locking plate 19, as shown in Fig. 5, so as to effectively prevent closing of the supply valve. As the float 33 rises it will cause the releasing plate 31 to force the latch 28 downwardly as shown in Fig. 6 until the projection 29 has released the tooth 21. This allows the float 17 to snap upwardly to the surface of the water and drops the yoke 16 so that the supply valve will immediately close.

It will be seen from the above that no water is allowed to enter the tank until the water therein has been discharged and no restriction of the supply valve is caused while the tank is filling. The supply valve opens and closes instantaneously at the extreme positions of the tank water level.

It is desired to call attention to the novel construction of the supply valve. It is desirable to have a valve which will open a relatively large unrestricted opening for the incoming water, but to open a large surface directly against the relatively high supply pressure would be impossible by a float operated mechanism. To overcome this I provide a valve in which a relatively small passage is first opened, followed instantly by increasingly larger passages so that the pressure will be relieved by the smaller passages before opening the larger passage is attempted.

To accomplish this I provide a series of valves increasing in size and designated by the numerals 33, 34, and 35, respectively. Each of these valves is provided with a suitable sized seating washer 36. The largest valve, 35, is carried on a sleeve 37, which extends slightly below the bottom of the valve chamber 13 and above the valve 35, to provide a seat 38 for the valve 34. The intermediate valve, 34, is carried on a smaller concentric sleeve 39, which extends slightly below the lower extremity of the sleeve 37 and above the valve 34, to provide a seat 40, for the valve 33. The smallest valve, 33, is carried on the extremity of a still smaller concentric sleeve 41, which extends below the lower extremity of the adjacent sleeve 39. The valve yoke 16 carries an upwardly projecting pin 42, which slides within the sleeve 41, and acts as a guide therefor.

As the yoke 16 is moved upwardly by the float 17, it will first contact with the lower extremity of the sleeve 41, lifting the smallest valve 33 from its seat 40. This allows the water from the chamber 13 to flow thru the sleeve 39 thus relieving the static pressure in the chamber. The yoke will now contact with the sleeve 39 and raise the intermediate valve 34, from its seat 38, still further relieving the pressure in the chamber 13 so as to allow the largest valve 35, to be lifted from its seat 15 by the contact of its sleeve 37 with the yoke 16. Thus the different valves open in succession, but this succession is so rapid that the entire opening is practically instantaneous.

As the yoke 16 lowers, the valves 35, 34, and 33, will close in reverse succession, thus eliminating the "water hammer" which would be caused by a single large valve instantly closing. Any "water hammer" which might be created by the quick closing of the three valves is absorbed by the air cushion in the standpipe 10. The several sleeves of the valves are kept in their proper spaced relation by means of longitudinal fins 43, see Fig. 8, which are cast upon the sleeves and act as guides therefor.

A screw cap 44 allows access to the valve chamber 13 so that the valves 33, 34, and 35 can be easily lifted from place for renewal of the washers 36.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A valve mechanism for controlling the water supply to a toilet tank comprising a valve adapted to control said supply; a float; a lever secured to said float at its one extremity and operatively connected to said valve at its other extremity; projections carried by said lever; and means for engaging said projections so as to lock said lever at its extreme positions and float operated means adapted to move said engaging means out of contact with said projections at predetermined times.

2. A valve mechanism for controlling the water supply to a toilet tank comprising a valve adapted to control said supply; a float; a lever secured to said float and operatively connected to said valve; a projection from said lever; means adapted to engage said projection so as to maintain said float at its uppermost position and float operated releasing means adapted to release said engaging means when a desired amount of water has discharged from said tank.

3. A valve mechanism for controlling the water supply to a toilet tank comprising a valve adapted to control said supply; a float; a lever secured to said float and operatively connected to said valve; projections carried by said lever; latch members adapted to engage said projections and a float operated releasing mechanism adapted to alternately move said latch members out of contact with said lever.

4. A valve mechanism for controlling the water supply to a toilet tank comprising a standpipe adapted to be placed in said tank and connected with said supply; a supply valve in communication with said standpipe; a lever pivotally supported on said standpipe and operatively connected to said valve; a float arranged to operate said lever; teeth projecting from said lever; a latch member adapted to engage one of said teeth to lock said lever in its uppermost position; a second latch member adapted to engage another of said teeth and lock said lever in its lowermost position; and float operated means adapted to alternately force said latch members out of contact with said teeth.

5. A valve mechanism for controlling the water supply to a toilet tank comprising a standpipe adapted to be placed in said tank and connected with said supply; a valve chamber carried by and in communication with said standpipe; a valve in said chamber; a lever pivotally supported by said standpipe and operatively connected to said valve; a float arranged to operate said lever; projections on said lever; a latch member adapted to engage one of said projections to lock said lever in its uppermost position; a second latch member adapted to engage another of said projections and lock said lever in its lowermost position and float operated means adapted to alternately force said latch members out of contact with said projections, said float operative means comprising a second lever; a second float arranged to operate said second lever and a releasing plate carried on said second lever; said releasing plate adapted to contact with said first latch member when said tank is emptied and with said second latch member when said tank is filled.

6. A valve mechanism for controlling the water supply to a toilet tank comprising a standpipe adapted to be placed in said tank and connected with said supply; a valve chamber carried by and in communication with said standpipe; a valve in said chamber; a lever pivotally supported by said standpipe and operatively connected to said valve; a float on one extremity of said lever; projections on said lever; a latch member adapted to engage one of said projections to lock said lever in its uppermost position; a second latch member adapted to engage another of said projections and lock said lever in its lowermost position and float operated means adapted to alternately force said latch members out of contact with said projections said latch members comprising piston-like members adapted to slide in said standpipe, said first latch member being gravity operated, said second member being spring actuated.

7. A standpipe and supply valve construction for toilet tanks comprising a standpipe; a partition in said standpipe adjacent its upward extremity; operating mechanism carried in said standpipe above said partition; a valve chamber in communication with said standpipe below said partition; a valve in said valve chamber; a connection between said operating mechanism and said valve and a float adapted to operate said operating mechanism.

8. A supply valve for toilet tanks comprising an annular valve seat; a series of concentric tubes within said valve seat, each of said tubes carrying a valve adapted to contact with a valve seat on an adjacent tube.

9. A supply valve for toilet tanks comprising an annular valve seat; a tube spaced from and projecting through said valve seat; a first valve carried by said tube and arranged to close said seat; a second valve seat carried by said first valve; a second valve adapted to close said second seat and means for opening said second and first valves, respectively, in succession.

10. A supply valve for toilet tanks comprising an annular valve seat; a first tube spaced from and projecting through said valve seat; a first valve carried by said first tube and adapted to seat on said seat; a second valve seat carried by said first valve; a second tube spaced within said first tube and arranged to project therebelow; a second valve carried by said second tube and arranged to seat on said second valve seat; a third valve seat carried by said second valve; a valve stem arranged within said second tube and adapted to project therebelow; a third valve carried by said valve stem and adapted to seat on said third valve seat; and means for raising said tubes and said stem by contact with the bottoms thereof, so that said valves will open in the reverse of the order above described.

11. A supply valve for toilet tanks comprising an annular valve seat; a first tube spaced from and projecting through said valve seat; a first valve carried by said first tube and adapted to seat on said seat; a second valve seat carried by said first valve; a second tube spaced within said first tube and arranged to project therebelow; a second valve carried by said second tube and arranged to seat on said second valve seat; a third valve seat carried by said second valve; a third tube arranged within said second tube and adapted to project therebelow; a third valve carried by said third tube and adapted to seat on said third valve seat; means for raising said tubes by contact with the bottoms thereof, so that said valves will open in the reverse of the order above described, and a pin carried by said raising means and adapted to project within said third tube and act as a guide therefor.

12. A supply valve for toilet tanks comprising an annular valve seat; a first tube spaced from and projecting through said valve seat; a first valve carried by said first tube and adapted to seat on said seat; a second valve seat carried by said first valve; a second tube spaced within said first tube and arranged to project therebelow; a second valve carried by said second tube and arranged to seat on said second valve seat; a third valve seat carried by said second valve; a valve stem arranged within said second tube and adapted to project therebelow; a third valve carried by said valve stem and adapted to seat on said third valve seat; and means for raising said tubes and said stem by contact with the bottoms thereof, so that said valves will open in the reverse of the order above described, and spacers carried by said tubes so as to maintain them in concentric, spaced relation.

In testimony whereof, I affix my signature.

CHARLES E. MACE.